(12) United States Patent
Chen et al.

(10) Patent No.: US 10,862,619 B2
(45) Date of Patent: Dec. 8, 2020

(54) METHOD AND APPARATUS FOR MACHINE TYPE COMMUNICATION OF SYSTEM INFORMATION

(71) Applicant: NEC Corporation, Tokyo (JP)

(72) Inventors: Yuhua Chen, London (GB); Yassin Aden Awad, Uxbridge (GB); Robert Arnott, London (GB)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/546,163

(22) PCT Filed: Jan. 13, 2016

(86) PCT No.: PCT/JP2016/000140
§ 371 (c)(1),
(2) Date: Jul. 25, 2017

(87) PCT Pub. No.: WO2016/121308
PCT Pub. Date: Aug. 4, 2016

(65) Prior Publication Data
US 2018/0019839 A1   Jan. 18, 2018

(30) Foreign Application Priority Data
Jan. 30, 2015 (GB) .................................. 1501618.1

(51) Int. Cl.
*H04L 1/00* (2006.01)
*H04W 48/10* (2009.01)
(Continued)

(52) U.S. Cl.
CPC .......... *H04L 1/0038* (2013.01); *H04L 1/0045* (2013.01); *H04L 1/0072* (2013.01);
(Continued)

(58) Field of Classification Search
CPC ... H04L 1/0038; H04L 1/0045; H04L 1/0072; H04W 76/14; H04W 48/10; H04W 48/12; H04W 92/10; H04W 72/12
See application file for complete search history.

(56) References Cited

U.S. PATENT DOCUMENTS

2007/0049344 A1    3/2007   Van Der Velde et al.
2009/0181661 A1    7/2009   Kitazoe et al.
(Continued)

FOREIGN PATENT DOCUMENTS

CN    104184548 A    12/2014
EP       2835990 A1     2/2015
(Continued)

OTHER PUBLICATIONS

International Search Report corresponding to PCT/JP2016/000140 dated Apr. 22, 2016—(6 pages).
(Continued)

*Primary Examiner* — Abdelnabi O Musa
(74) *Attorney, Agent, or Firm* — Wilmer Cutler Pickering Hale and Dorr LLP

(57) ABSTRACT

A communication system is described in which system information is transmitted to communication devices, by a communication apparatus of the system, in system information blocks, in accordance with a system information block transmission scheme. The communication apparatus configures at least one system information block to include control information indicating how the system information blocks will be transmitted.

28 Claims, 11 Drawing Sheets

(51) Int. Cl.
*H04W 92/10* (2009.01)
*H04L 1/08* (2006.01)
*H04W 76/14* (2018.01)
*H04W 48/12* (2009.01)
*H04W 72/04* (2009.01)
*H04W 72/12* (2009.01)

(52) U.S. Cl.
CPC .............. *H04L 1/08* (2013.01); *H04W 48/10* (2013.01); *H04W 48/12* (2013.01); *H04W 76/14* (2018.02); *H04W 92/10* (2013.01); *H04W 72/042* (2013.01); *H04W 72/12* (2013.01)

(56) References Cited

U.S. PATENT DOCUMENTS

| | | | |
|---|---|---|---|
| 2013/0136098 A1* | 5/2013 | Li | H04W 72/042 370/330 |
| 2014/0192733 A1 | 7/2014 | Charbit et al. | |
| 2015/0016312 A1* | 1/2015 | Li | H04L 5/14 370/280 |
| 2015/0099528 A1 | 4/2015 | Hu et al. | |
| 2015/0181575 A1* | 6/2015 | Ng | H04L 5/0092 370/329 |
| 2016/0050667 A1* | 2/2016 | Papasakellariou | H04L 5/0053 370/329 |
| 2016/0073381 A1* | 3/2016 | Ratasuk | H04W 4/70 370/329 |
| 2016/0269146 A1* | 9/2016 | Sun | H04L 1/0009 |
| 2016/0286555 A1* | 9/2016 | Papasakellariou | H04W 48/12 |
| 2016/0353440 A1* | 12/2016 | Lee | H04W 72/0453 |
| 2016/0374109 A1* | 12/2016 | Rico Alvarino | H04W 4/70 |
| 2017/0105166 A1* | 4/2017 | Lee | H04W 68/005 |
| 2017/0230951 A1 | 8/2017 | Xiong et al. | |
| 2017/0280481 A1* | 9/2017 | Stern-Berkowitz | H04W 74/008 |
| 2018/0007709 A1* | 1/2018 | Seo | H04L 5/001 |
| 2018/0270634 A1* | 9/2018 | Kim | H04W 72/0406 |

FOREIGN PATENT DOCUMENTS

| | | |
|---|---|---|
| GB | 2509557 A | 7/2014 |
| JP | 2012-157059 A | 8/2012 |
| JP | 2013-157892 A | 8/2013 |
| JP | 2013-243734 A | 12/2013 |
| JP | 2014-143644 A | 8/2014 |
| JP | 2017-510224 A | 4/2017 |
| JP | 2018-41995 A | 3/2018 |
| WO | WO-2004/089013 A1 | 10/2004 |
| WO | WO-2014/110785 A1 | 7/2014 |
| WO | WO-2014/129951 A1 | 8/2014 |
| WO | WO-2014/181156 A1 | 11/2014 |
| WO | WO-2015/012654 A1 | 1/2015 |
| WO | WO-2015/013858 A1 | 2/2015 |
| WO | WO-2015/066645 A1 | 5/2015 |
| WO | WO-2015/143244 A1 | 9/2015 |
| WO | WO-2016/053039 A1 | 4/2016 |

OTHER PUBLICATIONS

3GPP TS 22.368 V13.1.0 Service Requirements for Machine-Type Communications (MTC); Stage 1 (Release 13) (Dec. 2014) (pp. 1-26).

3GPP TSG RAN WG1 Meeting #78bis R1-143806; ZTE: "Concepts for coverage improvement for MTC UEs", Ljubljana, Slovenia; Oct. 2014 (5 pages).

3GPP TSG RAN WG1 Meeting #74 R1-133513; Huawei, HiSilicon: "Further discussion on coverage improvement for the data channels", Barcelona, Spain; Aug. 2013 (2 pages).

3GPP TSG RAN WG1 Meeting #72bis R1-131181; MediaTek Inc.: "Coverage Analysis of PUSCH and Enhancement Techniques for MTC UEs", Chicago, USA; Apr. 2013 (7 pages).

3GPP TSG RAN WG1 Meeting #79 R1-145391; Nokia Networks, Nokia Corporation: "Observations on SIB Performance for MTC", San Francisco, USA; Nov. 2014 (3 pages).

Chinese Notification of First Office Action issued in Chinese Patent Application No. 201680007963.1, dated Sep. 29, 2019, 17 pages.

Japanese Notice of Reasons for Refusal issued in Japanese Patent Application No. 2018-234273, dated Oct. 23, 2019, 4 pages.

Japanese Office Action issued by the Japan Patent Office for Japanese Application No. 2017-538744 dated Jul. 25, 2018 (6 pages).

NEC, "SIBl Scheduling for Rel-13 MTC UE," 3GPP TSG RAN WG2 Meeting #89b, R2-151428, Agenda Item 7.4.2, Bratislava, Slovakia, Apr. 20-24, 2015 (3 pages).

Nokia Networks, Nokia Corporation "Observations on SIB Performance for MTC" 3GPP TSG RAN WG1 #79, R1-145391, San Francesco, USA, USA, Nov. 17-21, 2014, Agenda item 6.3.1.2.2, 3 pages.

Nokia Networks, Nokia Corporation "Design of Common Control Messages for MTC" 3GPP TSG-RAN WG1 Meeting #79, R1-144996, San Francisco, USA, Nov. 17-21, 2014, 4 pages.

Samsung "Signaling and Design for SCH, PBCH, and PRACH" 3GPP TSG RAN WG1 #79, R1-144736, San Francisco, USA, Nov. 17-21, 2014, pp. 1-4.

MediaTek Inc. "SIB, RAR and Paging for Rel-13 MTC UE in Normal and Coverage Extension", 3GPP TSG RAN WG1 Meeting #79, R1-144851, San Francisco, USA, Nov. 17-21, 2014, 5 pages.

ZTE "Considerations on Common Control Messages for MTC Enhancement" 3GPP TSG RAN WG1 Meeting #79, R1-144820, San Francisco, US, Nov. 17-24, 2014, 7 pages.

LG Electronics "PBCH Transmission for MTC Coverage Enhancement", 3GPP TSG RAN WG1 #76, R1-140302, Prague, Czech Republic, Feb. 10-14, 2014, 5 pages.

Alcatel-Lucent, Alcatel-Lucent Shanghai Bell "Coverage Enhancement for Common Control Messages" 3GPP TSG RAN WG1 Meeting #79, R1-144698, San Francisco, USA, Nov. 17-24, 2014, 4 pages.

European Communication Pursuant to Article 94(3) EPC issued in European Patent Application No. 16702594.9, dated Sep. 21, 2020, 8 pages.

NTT DoCoMo, Inc. "BCCH Transmission Scheme", 3GPP TSG-RAN WG2 #55, R2-062994, Oct. 9-13, 2006, Seoul, Korea, 5 pages.

\* cited by examiner

```
MTCSystemInformationBlockType1  ::=      SEQUENCE {
    Extension                            BOOLEAN
    cellAccessRelatedInfo                SEQUENCE {
        Plmn-IdentityList                        PLMN-IdentityList,
        trackingAreaCode                 TrackingAreaCode,
        cellIdentity                     CellIdentity,
        cellBarred                               ENUMERATED {barred, notBarred}
        intraFreqReselection             ENUMERATED {allowed, notAllowed}
        csg-Indication                           BOOLEAN,
        csg-Identity                     CSG-Identity    OPTIONAL -- Need OR
    },
    ...
}
```

```
MTCSystemInformationBlockType1  ::=      SEQUENCE {
    Extension,                           CHOICE {
        release                          NULL,
        setup                            SEQUENCE {
            schedulingInfo               SchedulingInfo  )
        }
    ...
}
```

Figure 10a

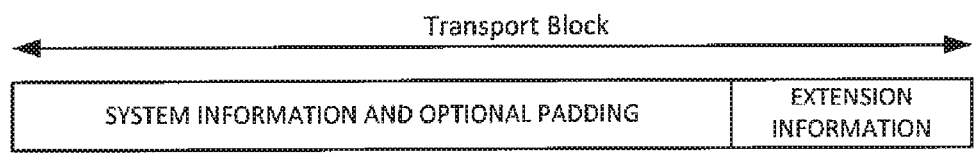

Figure 10b

```
MTC-SIBList  ::= SEQUENCE (SIZE (1..maxMTC-SIB)) OF MTC-SIBInfor

MTC-SIBInfor ::= SEQUENCE {              ENUMERATED {rf128, rf256, rf512...},
        MTC-SIB-Periodicity                         ENUMERATED {x, y, z...},
        MTC-SIB-offset                   ENUMERATED {ms100, ms150...},
        MTC-SIB-WindowLength                        ENUMERATED {x, y, z, m, n...},
        MTC-SIB-TBS

}
```

METHOD AND APPARATUS FOR MACHINE TYPE COMMUNICATION OF SYSTEM INFORMATION

TECHNICAL FIELD

The present invention relates to mobile communications devices and networks, particularly but not exclusively those operating according to the $3^{rd}$ Generation Partnership Project (3GPP) standards or equivalents or derivatives thereof. The invention has particular although not exclusive relevance to the Long Term Evolution (LTE) of UTRAN (called Evolved Universal Terrestrial Radio Access Network (E-UTRAN)), including LTE-Advanced.

BACKGROUND ART

In a mobile (cellular) communications network, (user) communication devices (also known as user equipment (UE), for example mobile telephones) communicate with remote servers or with other communication devices via base stations. In their communication with each other, communication devices and base stations use licensed radio frequencies, which are typically divided into frequency bands and/or time blocks.

In order to be able to communicate via the base stations, communication devices need to monitor control channels operated by the base stations. One of these physical control channels, the so-called physical downlink control channel (PDCCH) carries control information for scheduling of downlink and uplink resources to individual communication devices. Physical downlink control (PDCCH) channels are transmitted on an aggregation of one or several consecutive control channel elements (CCEs). Scheduling is realised by the serving base station transmitting, over the PDCCH, a Downlink Control Information (DCI) to each communication device that has been scheduled resources in the current scheduling round. Downlink data that has been scheduled this way is transmitted over the so-called Physical Downlink Shared Channel (PDSCH) using the resources allocated by the DCI. The PDSCH resources associated with the PDCCH control information (DCI) are normally provided within the same subframe, albeit using different frequencies.

Common control transmissions include, for example: Master Information Block (MIB) and System Information Block (SIB) broadcast; Random Access Response (RAR) messages; and Paging.

In order to communicate with the network the UE must obtain system information. System information includes configuration information about the network and the serving cell. Since this information is common to all users of the cell, it is broadcast to all UEs in the cell coverage area. System information is grouped into messages called the Master Information Block (MIB) and a number of System Information Blocks (SIBs). The MIB includes the most essential system information needed by the UE to acquire other information from the cell: the system bandwidth, the System Frame Number (SFN), and the Physical Hybrid Automatic Repeat Request (HARQ) Indicator Channel (PHICH) Configuration. The MIB is carried on the Broadcast Channel (BCH) mapped into the Physical Broadcast Channel (PBCH). This is transmitted with a fixed coding and modulation scheme and can be decoded after the initial cell search procedure. The MIB uses a fixed schedule with a periodicity of 40 ms and repetitions made within 40 ms. With the information obtained from the MIB the UE can then decode the Control Format Indicator (CFI), which indicates the PDCCH length. This allows the PDCCH to be decoded. The presence in the PDCCH of a DCI message scrambled with System Information Radio Network Temporary Identifier (SI-RNTI) indicates that a SIB is carried in the same subframe.

The SIBs are transmitted in the Broadcast Control Channel (BCCH) logical channel. Generally, BCCH messages are carried on the Downlink Shared Channel (DL-SCH) and transmitted on the PDSCH at periodic intervals. The format and resource allocation of the PDSCH transmission is indicated by a DCI message on the PDCCH. LTE/LTE-A defines different SIBs according to the type of system information that each SIB conveys. For example, SIB1 includes cell access information, including cell identity information, and it may indicate whether a UE is allowed to camp on an eNB. SIB1 also includes cell selection information (or cell selection parameters). Additionally, SIB1 includes scheduling information for other SIBs. Not all SIBs need to be present. Similar to MIBs, the SIBs are broadcast repeatedly. In general, a lower-order SIB is more time critical and is transmitted more often compared to a higher-order SIB. SIB1 is transmitted every 80 ms, whereas the transmission period for the higher-order SIBs is flexible and can be different for different networks. SIBs other than SIB1 are carried in System Information (SI) messages. Mapping of SIBs to SI messages is configured flexibly by scheduling information included in SIB Type 1 with some restrictions, including that only SIBs with the same scheduling requirement (periodicity) can be mapped to the same SI message.

After the system information of a cell has been acquired, the UE can attempt to establish an initial connection by sending a short message on the random access channel. To minimize the possibility that several devices attempt to send a message simultaneously which results in a network access collision, firstly the message itself is only very short and only contains a 5 bit random number. Furthermore, the network offers many random access slots per second to randomize access requests over time. When the network picks up the random access request, it assigns a Cell-Radio Network Temporary Identifier (C-RNTI) to the mobile and answers the message with a Random Access Response message. In addition, the message contains an initial uplink bandwidth grant, that is, a set of resource blocks of the shared uplink channel that the UE can use in the uplink direction. These resources are then used to send the RRC connection request message that encapsulates an initial attach request.

The main purpose of a paging message is to page UEs in RRC_IDLE mode for a mobile terminated call. Also the paging message can be used to inform UEs, in RRC_IDLE as well as RRC_CONNECTED modes, that system information will be changed or that the ETWS notification is posted in SIB10 or SIB 11.

Recent developments in telecommunications have seen a large increase in the use of machine-type communications (MTC) UEs which are networked devices arranged to communicate and perform actions without human assistance. Examples of such devices include smart meters, which can be configured to perform measurements and relay these measurements to other devices via a telecommunication network. Machine-type communication devices are also known as machine-to-machine (M2M) communication devices.

MTC devices connect to the network whenever they have data to send to or receive from a remote 'machine' (e.g. a server) or user. MTC devices use communication protocols and standards that are optimised for mobile telephones or similar user equipment. However, MTC devices, once deployed, typically operate without requiring human supervision or interaction, and follow software instructions stored in an internal memory. MTC devices might also remain stationary and/or inactive for a long period of time. The specific network requirements to support MTC devices have been dealt with in the 3GPP TS 22.368 standard, the contents of which are incorporated herein by reference.

For the Release 13 (Rel-13) version of the standards relating to MTC devices, support for a reduced bandwidth of 1.4 MHz in downlink and uplink is envisaged. Thus, some MTC devices (referred to as 'reduced bandwidth MTC devices') will support only a limited bandwidth (typically 1.4 MHz) compared to the total LTE bandwidth and/or they may have fewer/simplified components. This allows such 'reduced bandwidth' MTC devices to be made more economically compared to MTC devices supporting a larger bandwidth and/or having more complicated components.

Further, the lack of network coverage (e.g. when deployed indoors), in combination with the often limited functionality of MTC devices, can result in such MTC devices having a low data rate and therefore there is a risk of some messages or channels not being received by an MTC device. In order to mitigate this risk, it has been proposed to increase the coverage of the PDCCH (or enhanced PDCCH ('EPDCCH') in Rel-13) to support such MTC devices (e.g. corresponding to 20 dB for frequency division duplex (FDD) transmissions). To facilitate such enhanced coverage, each MTC device will need to inform its serving base station of the amount of coverage required (e.g. 5 dB/10 dB/15 dB/20 dB coverage enhancement) to allow the base station to adjust its control signalling appropriately.

Ideally, physical layer control signalling (such as (E)PDCCH, PUCCH, and/or the like) and higher layer common control information (e.g. SIB, random access response (RAR), paging messages, and/or the like) exhibit a high level of commonality between solutions for reduced bandwidth communication devices and solutions for coverage enhanced communication devices.

3GPP has recently agreed on LTE Physical Layer Enhancements for MTC in Rel-13, including agreements on PBCH and unicast transmission. For PBCH, it will use the legacy mechanism with more repetition. For unicast transmission: PDSCH transmission will be scheduled by 'physical downlink control channel for MTC' with cross-subframe scheduling supported. However, it is not yet known how to schedule certain common control transmissions (e.g. SIB/RAR/Paging common control messages) for MTC devices. There are at least two options, which are described below.

SUMMARY OF INVENTION

Technical Problem

The first option involves control-less common control transmission. This is a PBCH-like design in which transmission timing, resource allocation (RA) and transmission formats (MCS, RV, etc.) are predefined for the common control information transmission. Furthermore, the Transport Block Size (TBS)/message size is fixed. For example, in frequency-domain, all 6 RBs in 1.4 MHz are used to carry SIB, and also a predefined periodicity in time-domain. An advantage of this option is that it provides overhead reduction as well as power consumption reduction at the UE, due to elimination of the control transmission. However, a disadvantage of this is that it lacks eNodeB scheduling flexibility.

The second option involves EPDCCH Common Search Space (CSS) transmission, which defines CSS in EPDCCH to provide dynamic scheduling for the common control information for Rel-13 low complexity UEs. An advantage of this option is the eNodeB scheduling flexibility that achieves an efficient system operation. However, a disadvantage of this is the control overhead increase compared to the first option, more specifically for coverage enhanced mode where a significant number of repetitions of the SIBs are needed.

The present invention seeks to provide systems, devices and methods which at least partially address the above issues.

Solution to Problem

In one aspect, the invention provides a communication apparatus for a communication system in which system information is transmitted to communication devices, by the communication apparatus, in system information blocks transmitted in accordance with a system information block transmission scheme, the communication apparatus comprising: means for operating a cell; means for configuring at least one system information block to include control information for indicating at least one of the following: (i) which of a plurality of different system information block transmission schemes the system information blocks will be transmitted in accordance with, wherein each of said plurality of different system information block transmission schemes involves the transmission of system information blocks of a different respective size; (ii) whether or not said at least one system information block has been extended; and (iii) whether or not at least one further system information block will be transmitted after said at least one system information block; and means for transmitting, to the communication devices within the cell, said system information blocks in accordance with said system information block transmission scheme.

In one aspect, the invention provides a communication apparatus for a communication system in which system information is transmitted to communication devices, by the communication apparatus, in system information blocks transmitted in accordance with a system information block transmission scheme, the communication apparatus comprising: means for operating a cell; means for transmitting, to the communication devices within the cell, said system information blocks in accordance with any of a plurality of system information block transmission schemes, wherein each system information transmission scheme involves the transmission of system information blocks of a different respective size.

In one aspect, the invention provides a communication device for a communication system in which system information is transmitted by communication apparatus, to the communication device, in system information blocks transmitted in accordance with a system information block transmission scheme, the communication device comprising: means for communicating with the communication apparatus within a cell operated by that communication apparatus, wherein the means for communicating is operable to receive, from the communication apparatus, at least one system information block configured to include control information for indicating at least one of the following: (i) which of a plurality of different system information block transmission schemes the system information block will be transmitted in accordance with, wherein each of said plurality of different system information block transmission schemes involves the transmission of system information blocks of a different respective size; (ii) whether or not said at least one system information block has been extended; and (iii) whether or not at least one further system information block will be transmitted after said at least one system information block; and means for obtaining the system information from one or more system information blocks based on with the control information.

In one aspect, the invention provides a communication device for a communication system in which system information is transmitted by communication apparatus, to the communication device, in system information blocks transmitted in accordance with a system information block transmission scheme, the communication device comprising: means for communicating with the communication apparatus within a cell operated by that communication apparatus, wherein the means for communicating is operable to receive, from the communication apparatus, said system information blocks in accordance with any of a plurality of system information block transmission schemes, wherein each system information block transmission scheme involves the transmission of system information blocks of a different respective size; and means for obtaining the system information from one or more system information blocks by attempting to decode the one or more system information blocks in accordance with a first of said system information transmission schemes and, if unsuccessful, attempting to decode the one or more system information blocks in accordance with another of said system information block transmission schemes.

In one aspect, the invention provides a method performed by a communication apparatus for a communication system in which system information is transmitted to communication devices, by the communication apparatus, in system information blocks transmitted in accordance with a system information block transmission scheme, the method comprising: operating a cell; configuring at least one system information block to include control information for indicating at least one of the following: (i) which of a plurality of different system information block transmission schemes the system information blocks will be transmitted in accordance with, wherein each of said plurality of different system information block transmission schemes involves the transmission of system information blocks of a different respective size; (ii) whether or not said at least one system information block has been extended; and (iii) whether or not at least one further system information block will be transmitted after said at least one system information block; and transmitting, to communication devices within the cell, said system information blocks in accordance with said system information block transmission scheme.

In one aspect, the invention provides a method performed by a communication apparatus for a communication system in which system information is transmitted to communication devices, by the communication apparatus, in system information blocks transmitted in accordance with a system information block transmission scheme, the method comprising: operating a cell; transmitting, to the communication devices within the cell, said system information blocks in accordance with any of a plurality of system information block transmission schemes, wherein each system block information transmission scheme involves the transmission of system information blocks of a different respective size.

In one aspect, the invention provides a method performed by a communication device for a communication system in which system information is transmitted by communication apparatus, to the communication device, in system information blocks transmitted in accordance with a system information block transmission scheme, the communication device comprising: communicating with the communication apparatus within a cell operated by that communication apparatus, wherein the means for communicating is operable to receive, from the communication apparatus, at least one system information block configured to include control information for indicating at least one of the following: (i) which of a plurality of different system information block transmission schemes the system information blocks will be transmitted in accordance with, wherein each of said plurality of different system information block transmission schemes involves the transmission of system information blocks of a different respective size; (ii) whether or not said at least one system information block has been extended; and (iii) whether or not at least one further system information block will be transmitted after said at least one system information block; and obtaining the system information from one or more system information blocks based on the control information.

In one aspect, the invention provides a method performed by a communication device of a communication system in which system information is transmitted by communication apparatus, to the communication device, in system information blocks transmitted in accordance with a system information block transmission scheme, the method comprising: communicating with the communication apparatus within a cell operated by that communication apparatus, wherein the means for communicating is operable to receive, from the communication apparatus, said system information blocks in accordance with any of a plurality of system information block transmission schemes, wherein each system information block transmission scheme involves the transmission of system information blocks of a different respective size; and obtaining the system information from one or more system information blocks by attempting to decode the one or more system information blocks in accordance with a first of said system information transmission schemes and, if unsuccessful, attempting to decode the one or more system information blocks in accordance with another of said system information block transmission schemes.

Aspects of the invention extend to corresponding systems, methods, and computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

Exemplary embodiments of the invention will now be described by way of example only with reference to the attached figures in which:

BRIEF DESCRIPTION OF DRAWINGS

FIG. 10a illustrates an exemplary way in which an MTC specific common control signalling can be provided in the system shown in FIG. 1;

FIG. 10b illustrates an exemplary way in which an MTC specific common control signalling can be provided in the system shown in FIG. 1;

DESCRIPTION OF EMBODIMENTS

<Overview>

Figure 1:
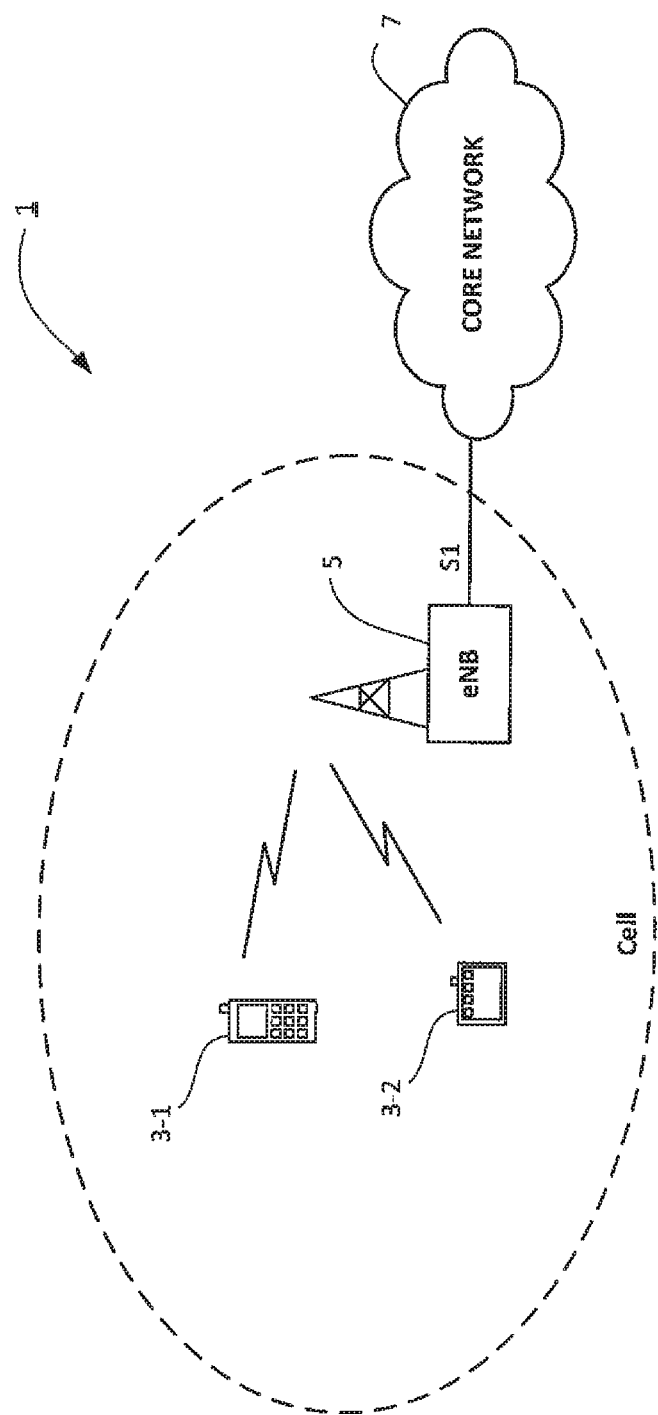
FIG. 1 schematically illustrates a telecommunication system to which embodiments of the invention may be applied.

FIG. 1 schematically illustrates a mobile (cellular) telecommunication system 1 in which user equipment 3 (communication devices such as mobile telephone 3-1 and MTC device 3-2) can communicate with each other and/or with other communication nodes via an E-UTRAN base station 5 (denoted 'eNB') and a core network 7. As those skilled in the art will appreciate, whilst one mobile telephone 3-1, one MTC device 3-2, and one base station 5 are shown in FIG. 1 for illustration purposes, the system, when implemented, will typically include other base stations and communication devices.

The base station 5 is connected to the core network 7 via an S1 interface. The core network 7 includes, amongst others: a gateway for connecting to other networks, such as the Internet and/or to servers hosted outside the core network 7; a mobility management entity (MME) for keeping track of the locations of the communication devices 3 (e.g. the mobile telephone and the MTC device) within the communication network 1; and a home subscriber server (HSS) for storing subscription related information (e.g. information identifying which communication device 3 is configured as a machine-type communication device) and for storing control parameters specific for each communication device 3.

The base station 5 is configured to provide a number of control channels, including, for example, a physical downlink control channel (PDCCH) and a physical uplink control channel (PUCCH). The PDCCH is used by the base station 5 for allocating resources to the communication devices 3 (typically by sending a UE-specific DCI to each communication device that has been scheduled in the current scheduling round). The PUCCH is used by the communication devices 3 for sending a UE-specific UCI to the base station (e.g. an appropriate HARQ Ack/Nack corresponding to downlink data received using the resources allocated by the DCI).

Each communication device 3 may fall into one or more of categories of UEs. A first category of UEs include communication devices that support only an earlier release of the LTE standard (e.g. Rel-8, Rel-9, Rel-10, Rel-11, and/or Rel-12). Such group of communication devices are commonly referred to as legacy UEs (assuming that the base station 5 is operating in accordance with Rel-13 of the LTE standards). A second category of UEs include reduced bandwidth UEs (e.g. Rel-13 MTC devices capable of using a 1.4 Mhz bandwidth only), which are not able to communicate over the entire bandwidth available in the cell of the base station 5. A third category of UEs includes coverage enhanced UEs (e.g. some MTC devices), which require certain base station functionalities to be simplified and/or relaxed (although such coverage enhanced UEs may support other functionalities as normal).

Beneficially, in order to support (but not limited to use with) reduced bandwidth MTC devices, the telecommunication system employs an enhanced control-less common control transmission scheme in which the amount of system information transmitted and/or the number of repetitions of the system information, can be varied flexibly depending on requirements without a significant increase in signalling overhead to inform the UE(s).

Specifically, the enhanced control-less common control transmission scheme has the potential to allow a relatively small or relatively large amount of system information to be transmitted in an optimum manner and provides the flexibility for the scheme to be extended further, with relatively little impact, to allow even larger amounts of system information to be transmitted in the future (e.g. for compatibility with future releases of the standards).

A number of specific embodiments of the enhanced control-less common control transmission scheme are now summarised by way of example.

In one exemplary embodiment, for example, the enhanced control-less common control transmission scheme uses spare bits of a MIB to indicate one of a plurality of different predetermined TBS/message sizes and/or corresponding scheduling scheme (number of repetitions). Advantageously, the number of spare bits required is minimized (e.g., two to represent a possible four different schemes). This is because transmission parameters such as the modulation scheme or coding rate can be fixed or implicitly depend on the TBS/message size and/or number of repetitions.

In an variation to the above exemplary embodiment, the UE is not explicitly informed of which of the predetermined TBS and scheduling schemes is used but instead performs blind decoding to detect which message transmission format is used. Beneficially, this minimises the changes to current system elements required to implement the proposals and in particular minimises the impact on signalling configurations and overhead albeit at the expense of the resources required to perform the blind decoding.

In another exemplary embodiment, for example, the enhanced control-less common control transmission scheme uses bit(s) in an MTC-SIB to indicate that an extension to the MTC-SIB(s) is being provided. This has the advantage of improved backward/forward compatibility. For example, Rel-13 MTC UEs only needs to read the Rel-13 part of SI regardless of the extension availability whereas a later release UE can read the extended part based on the availability bit and corresponding scheduling information, which in this example is pre-configured (e.g. in accordance with a standards specification of the corresponding release) but could be provided dynamically in the MTC-SIB.

In yet another exemplary embodiment, for example, the enhanced control-less common control transmission scheme uses bit(s) in an MTC-SIB to indicate that one or more further MTC-SIBs will be transmitted.

In yet another exemplary embodiment the enhanced control-less common control transmission scheme provides a dedicated 'scheduling' or 'Master' MTC-SIB including information which indicates the existence of any other MTC-SIBs which will be transmitted.

It will be appreciated that, in any of the aforementioned embodiments, one or more additional bits can be used to dynamically indicate (additional) scheduling information (e.g. information such as periodicity, offset, repeating times/ window, resource allocation(s), transmission format and/or the like) for the future SIB(s) (either in the form of specific scheduling information or in the form of an identity of one of a plurality of pre-configured schemes). However, the provision of such (additional) scheduling information dynamically is entirely optional and the scheduling information can be preconfigured instead.

Therefore, in effect, the above exemplary embodiments provide an advantageous solution which provides possible advantages over both the control-less common control transmission option and the EPDCCH Common Search Space (CSS) transmission option referred to in the background section and also opens the possibility to extend the SIB size in the future as well as improving scheduling flexibility.

<Communication Device>

Figure 2:
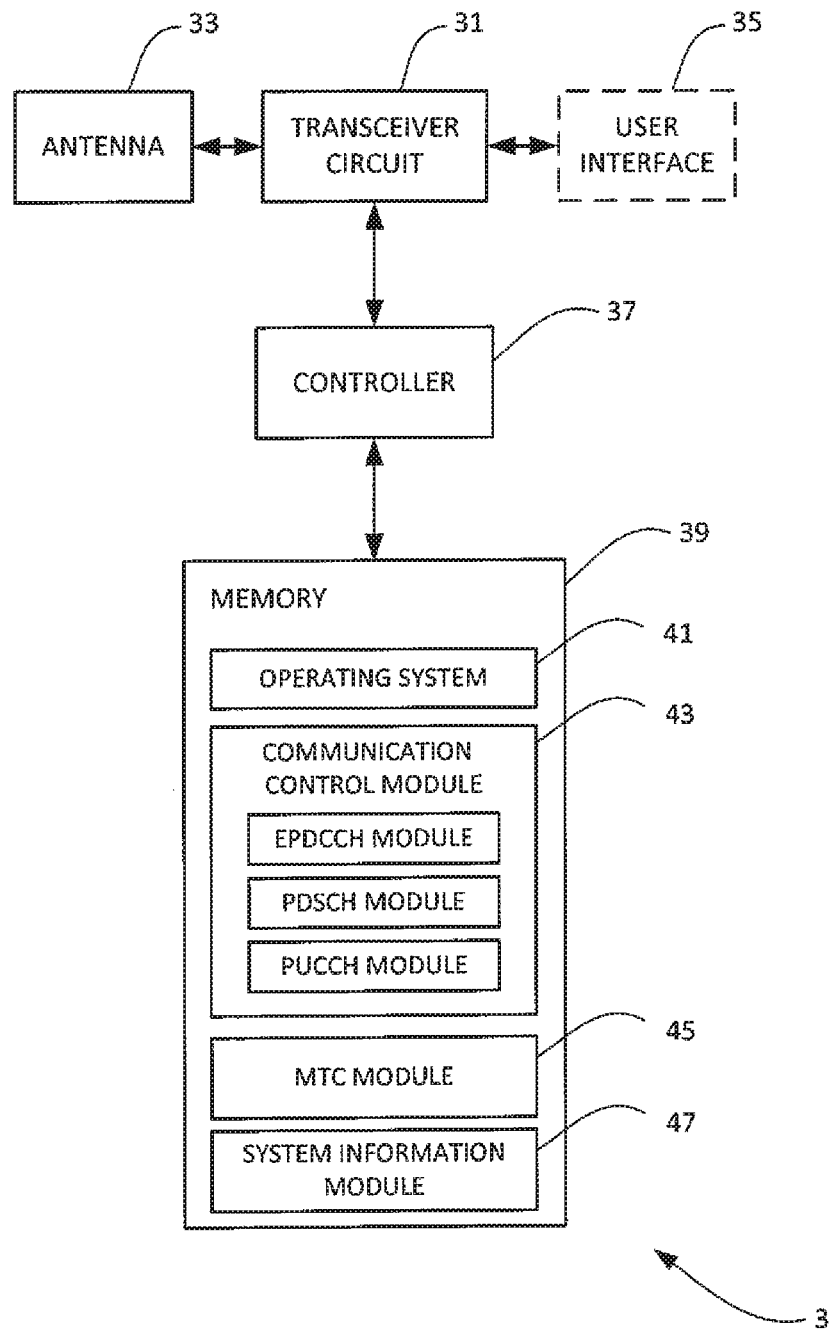
FIG. 2 is a block diagram illustrating the main components of the communication device shown in FIG. 1.

FIG. 2 is a block diagram illustrating the main components of the communication device 3 shown in FIG. 1. The communication device 3 may be an MTC device or a mobile (or 'cellular') telephone configured as a machine-type communication device. The communication device 3 comprises a transceiver circuit 31 which is operable to transmit signals to, and to receive signals from, the base station 5 via at least one antenna 33. Typically, the communication device 3 also includes a user interface 35 which allows a user to interact with the communication device 3, however this user interface 35 may be omitted for some MTC devices.

The operation of the transceiver circuit 31 is controlled by a controller 37 in accordance with software stored in memory 39. The software includes, among other things, an operating system 41, a communication control module 43, an MTC module 45, and a system information module 47.

The communication control module 43 controls communications between the communication device 3 and the base station 5 and/or other communication nodes (via the base station 5). As shown in FIG. 2, the communication control module 43 includes, amongst others, an EPDCCH module portion (for managing communications over the enhanced physical downlink control channel), a PDSCH module portion (for managing communications over the physical downlink shared channel), and a PUCCH module portion (for managing communications over the physical uplink control channel). The MTC module 45 is operable to carry out machine-type communication tasks. For example, the MTC module 45 may (e.g. periodically) receive data from a remote server (via the transceiver circuit 31) over resources allocated to the MTC device 3 by the base station 5. The MTC module 45 may also collect data for sending (e.g. periodically and/or upon detecting a trigger) to a remote server (via the transceiver circuit 31).

The system information module 47 is responsible for locating, identifying and decoding system information received in system information blocks via the antenna 33 and transceiver circuit 31, in accordance with the enhanced control-less common control transmission scheme of any of the embodiments described herein.

<Base Station>

Figure 3:
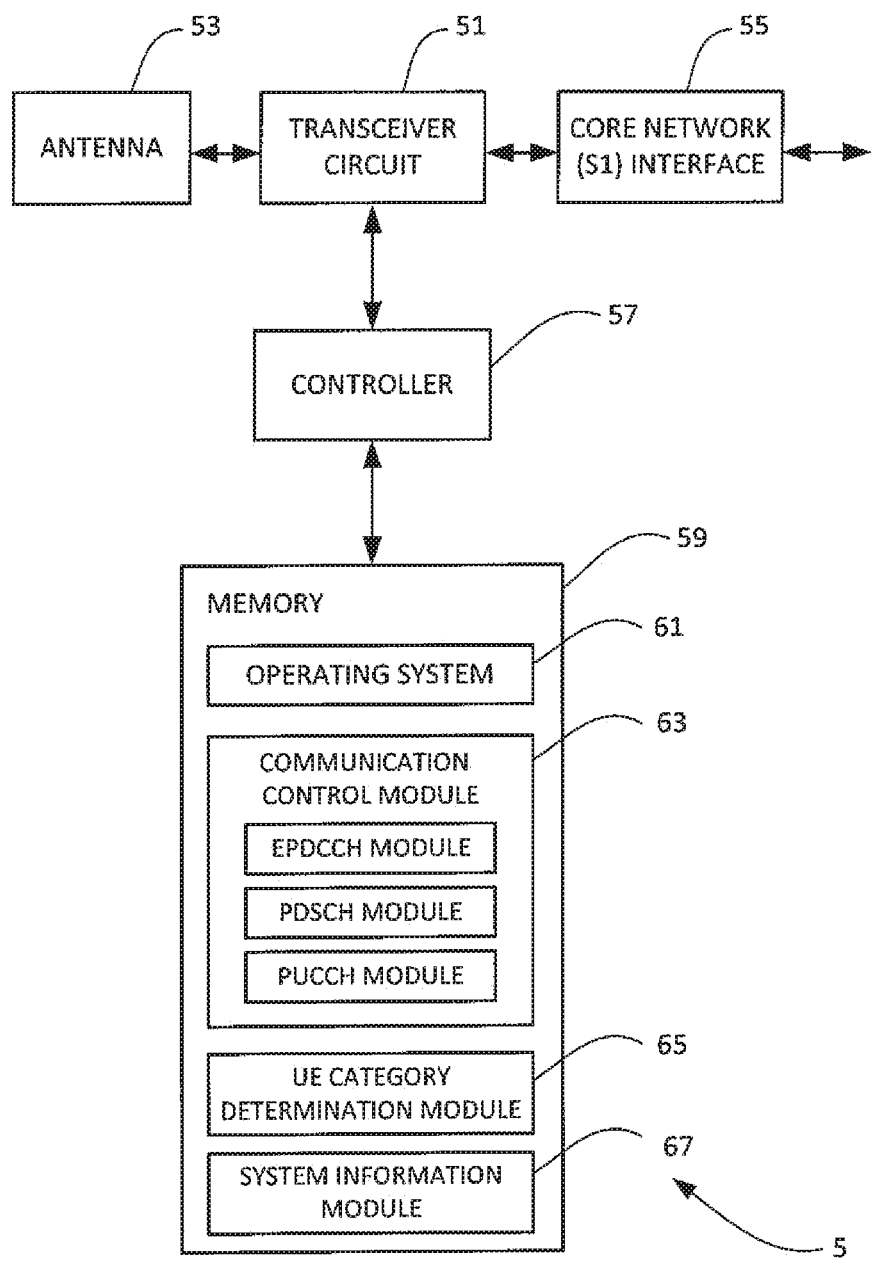
FIG. 3 is a block diagram illustrating the main components of the base station shown in FIG. 1.

FIG. 3 is a block diagram illustrating the main components of the base station 5 shown in FIG. 1. The base station 5 comprises an E-UTRAN base station (eNB) comprising a transceiver circuit 51 which is operable to transmit signals to, and to receive signals from, the communication devices 3 via one or more antennas 53. The base station 5 is also operable to transmit signals to and to receive signals from a core network 7 via an appropriate core network interface 55 (such as an S1 interface). The operation of the transceiver circuit 51 is controlled by a controller 57 in accordance with software stored in memory 59.

The software includes, among other things, an operating system 61, a communication control module 63, a UE category determination module 65 and a system information module 67.

The communication control module 63 controls communications with the communication devices 3 (including any MTC devices). The communication control module 63 is also responsible for scheduling the resources to be used by the communication devices 3 served by this base station 5. As shown in FIG. 3, the communication control module 63 includes, amongst others, an EPDCCH module portion (for managing communications over the enhanced physical downlink control channel), a PDSCH module portion (for managing communications over the physical downlink shared channel), and a PUCCH module portion (for managing communications over the physical uplink control channel).

The UE category determination module 65 determines the category of the communication devices 3 served by the base station 5, based on, for example, information obtained from the communication devices 3 and/or from another network node (e.g. the HSS). When appropriate, the UE category determination module 65 provides information identifying the category of each served communication devices to the other modules, e.g. the communication control module 53, so that the other modules can adjust their operation accordingly.

The system information module 67 is responsible for managing the transmission of system information in system information blocks via the antenna 53 and the transceiver circuit 51, in accordance with the enhanced control-less common control transmission scheme of any of the exemplary embodiments described herein.

In the above description, the communication device 3 and the base station 5 are described for ease of understanding as having a number of discrete modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

The following is a description of various ways in which common control signalling may be provided in LTE systems.

<System Information for Rel-13 Low Complexity UEs>

As noted earlier, for the Rel-13 version of the standards relating to MTC devices a number of requirements compared to legacy systems have been decided. For example, the system information has to repeat enough times to make sure 15 dB coverage improvement UEs can receive SIBs correctly. However, more repetitions are needed for bigger TB sizes. Thus, it would be desirable to limit any increase in size while also providing scheduling flexibility. On the other hand, this may limit possible further extensions in future releases.

These issues may be overcome or ameliorated by employing one or more of the following enhanced control-less common control transmission examples 1 to 4 described below. The concept is based on the idea of finding an improved control-less common control transmission which provides possible advantages over both the control-less common control transmission option and the EPDCCH Common Search Space (CSS) transmission option and also opens the possibility of extending the SIB size in the future as well as improving scheduling flexibility.

Example 1

Operation—First Example

Figure 4:
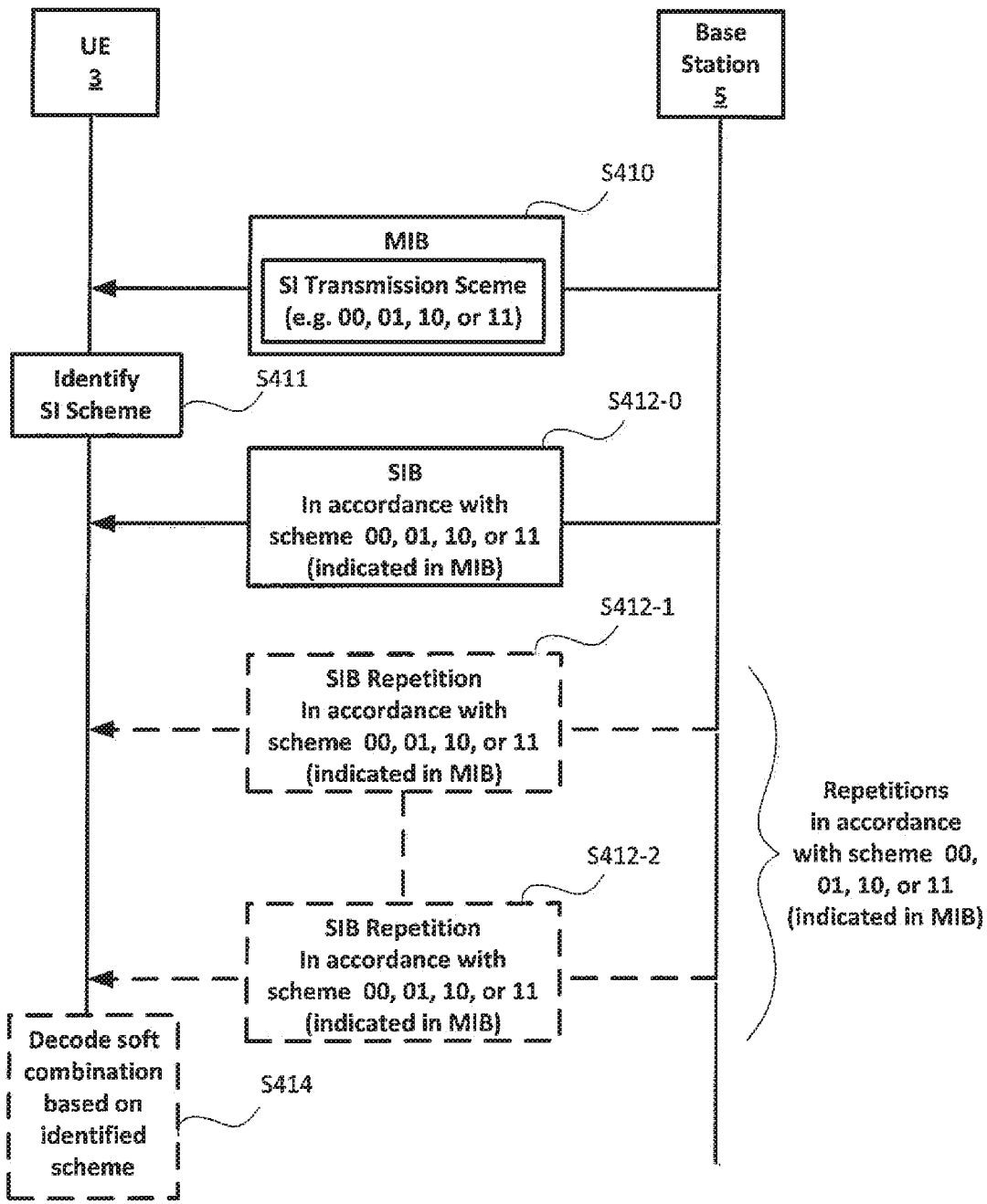
FIG. 4 illustrates an exemplary way in which an MTC specific common control signalling can be provided in the system shown in FIG. 1.

A first exemplary way in which an MTC common control transmission can be provided in the system shown in FIG. 1 is illustrated in FIG. 4.

As seen in FIG. 4, at step S410, a MIB is sent by the base station 5 to the UE 3 and number of bits in the MIB are used to indicate one of a plurality of predefined system information transmission schemes each representing a different respective configuration of transmission block size (TBSs), corresponding scheduling scheme, and number of repetitions. In particular, four combinations of two bits are defined as follows:

"00" indicates a TBS of 152 bits, time domain repetition N1;
"01" indicates a TBS of 256 bits, time domain repetition N2 (N2>N1);
"10" indicates a TBS of 328 bits, time domain repetition N3 (N3>N2); and
"11" indicates a TBS of 504 bits, time domain repetition N4 (N4>N3).

The predefined values N1, N2, N3 and N4 are the number of repetitions needed to achieve the same coverage target for the respective TBSs.

Thus, in this example the TBS/message size is variable and signalled in the MIB. Likewise, the repetitions in time-domain are variable and depend on the TBS size to reach the enhanced coverage target. On the other hand, the resource allocation (RA) is fixed to 6 Resource Blocks (RBs) in the frequency domain and the modulation is fixed to QPSK. Furthermore, the coding rate implicitly depends on the TBS size. As such, it is not necessary to transmit information indicating the resource allocation, the modulation or the coding rate.

At step S411, the UE 3 identifies from the corresponding bits of the MIB which of the plurality of predefined system information transmission schemes will be used for SIB transmission and hence what predefined transmission block size (TBSs), corresponding scheduling scheme and number of repetitions will be used.

At step S412-0, the first SIB is sent by the base station 5 in accordance with the system information transmission scheme it identified in the MIB. This procedure is then repeated (if required) in accordance with the system information transmission scheme identified in the MIB as illustrated by steps S412-1, S412-2 (two repetitions are shown for simplicity but any number—including no repetitions—are possible). Then, after the number of repetitions for the identified scheme, at step S414, the UE 3 decodes the soft combination of the received SIBs based on the system information transmission scheme that it identified form the MIB in order to derive the system information. It will be appreciated that whilst, in this example, the decoding of the soft combination takes place after a number of SIB transmission repetitions, the soft combination itself will take place cumulatively after every SIB retransmission.

Although in this particular example two bits in the MIB are used, it will be understood that fewer or more bits could be used depending on the number of predefined TBS sizes.

Figure 5:
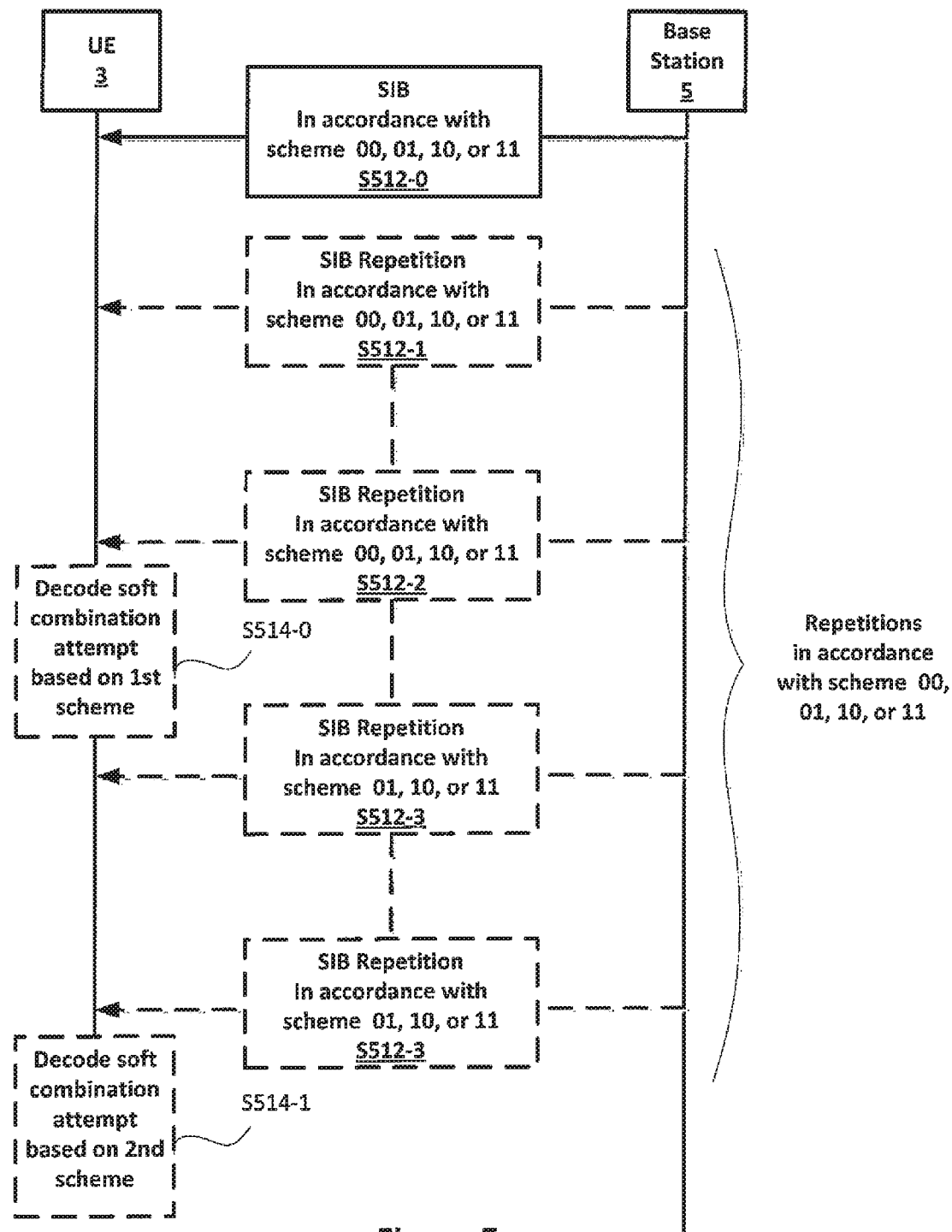
FIG. 5 illustrates an exemplary way in which an MTC specific common control signalling can be provided in the system shown in FIG. 1.

In a variant of this example, illustrated in FIG. 5, the communication device 3 (e.g., MTC device 3-2) is not informed by the base station 5 of the system information transmission scheme being used and so does not automatically know the TBS and number of repetitions but instead performs 'blind decoding' to determine which TBS is being used.

Specifically, in this variant the base station 5 simply sends the first SIB in accordance with an unidentified system information transmission scheme. This procedure is then repeated (e.g. steps S512-1, S512-2, S512-3, S512-4) for the number of repetitions associated with the system information transmission scheme. At step S514-0, following the number of repetitions associated with the system information transmission scheme involving the smallest TBS (and hence the smallest number of repetitions) the UE 3 attempts to decode the previously received SIBs using soft combination of all repetitions from the first repetition to the latest repetition based on that system information transmission scheme. If decoding is not successful, then at step S514-1, following a total number of repetitions associated with the system information transmission scheme involving the next smallest TBS (and hence the next smallest number of repetitions) the UE 3 attempts to decode the previously received SIBs using soft combination of all repetitions from the first repetition to the latest repetition based on that system information transmission scheme. This procedure continues until successful decoding is achieved. It will be appreciated that whilst, in this example, the attempted decoding of the soft combination takes place after a number of SIB transmission repetitions, and then if unsuccessful after another number of SIB transmission repetitions, the soft combination itself will take place cumulatively after every SIB retransmission.

The procedure is explained in more detail below with reference to the aforementioned exemplary TBSs and corresponding scheduling schemes.

(i) For repetitions 1 to N1, the communication device 3 attempts soft combination and decoding of the TB assuming a TBS of 152 bits;
(ii) If (i) fails, then during repetitions N+1 to N2, the communication device 3 attempts decoding of the TB assuming a TBS of 256 bits using soft combination of all repetitions from 1 up to the latest repetition (i.e. N2);
(iii) If (ii) fails, then during repetitions N+2 to N3, the communication device 3 attempts decoding of the TB assuming a TBS of 328 bits using soft combination of all repetitions from 1 up to the latest repetition (i.e. N3);
(iv) If (iii) fails, then for repetitions N+3 to N4, the communication device 3 attempts decoding of the TB assuming a TBS of 504 bits using soft combination of all repetitions from 1 up to the latest repetition (i.e. N4).

It will be appreciated that in either variant of this example the UE may decode or attempt to decode the soft combination of previously received SIBs at any appropriate interval (e.g. after every repetition or after every other repetition, or the like).

Example 2

Operation—Second Example

Figure 6:
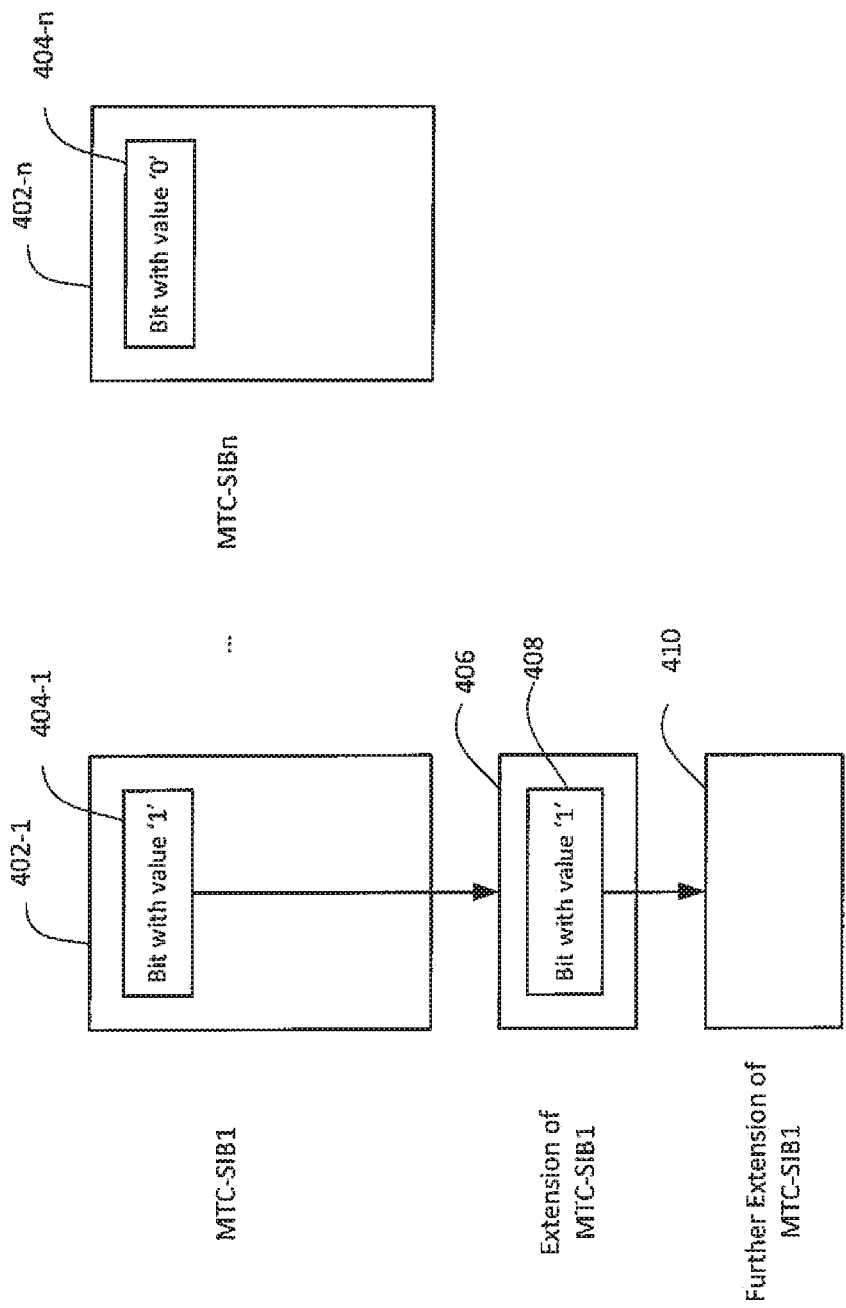
FIG. 6 illustrates an exemplary way in which an MTC specific common control signalling can be provided in the system shown in FIG. 1.

A second exemplary way in which an MTC common control transmission can be provided in the system shown in FIG. 1 is illustrated in FIG. 6 in which bits of one or more dedicated MTC-SIB(s) are used to indicate the presence of an extension to the MTC-SIB(s).

As seen in FIG. 6, each MTC-SIB, 402-1 to 402-n, can include one (or more) bit(s), 404-1 to 404n, indicating the availability (or lack of availability) of an extension 406 of that MTC-SIB 402. Specifically, each MTC-SIBs includes, in this example, a single bit information element (or flag) having, for example, one of two values such as "1" or "0", respectively indicating whether or not an extension 406 of the MTC-SIB 402 is available.

Furthermore, the extension 406 of that MTC-SIB includes a single bit information element (or flag) having, for example, one of two values such as "1" or "0", respectively indicating whether or not a further extension 410 of that MTC-SIB is available. Thus, in the example shown in FIG. 6, MTC-SIB 402-1 includes a bit 404-1 having a value of "1" indicating that the extension 406 of the SIB 402-1 is available. Furthermore, the extension 406 of the SIB 402-1 includes a bit 408 having a value of "1" indicating that a further extension 410 of the SIB 402-1 is available. On the other hand, MTC-SIB 402-n includes a bit 404-n having a value of "0" indicating that no extension of the SIB 402-n is available. Thus, the bit effectively functions as a pointer indicating availability of an extension (or further extension).

In practice, this example may be implemented for the Rel-13 version of the standards relating to MTC devices by setting the bit to "0" and allowing future releases to allow the bit to be set to "1" and define the extension part. For example, the extension part could define: the message for the extension part of MTC-SIB # n (TBS) and its scheduling scheme, a resource allocation (RA) (including time and spectrum position and repetition times), or transmission formats (MCS, RV, etc.).

Figure 7:
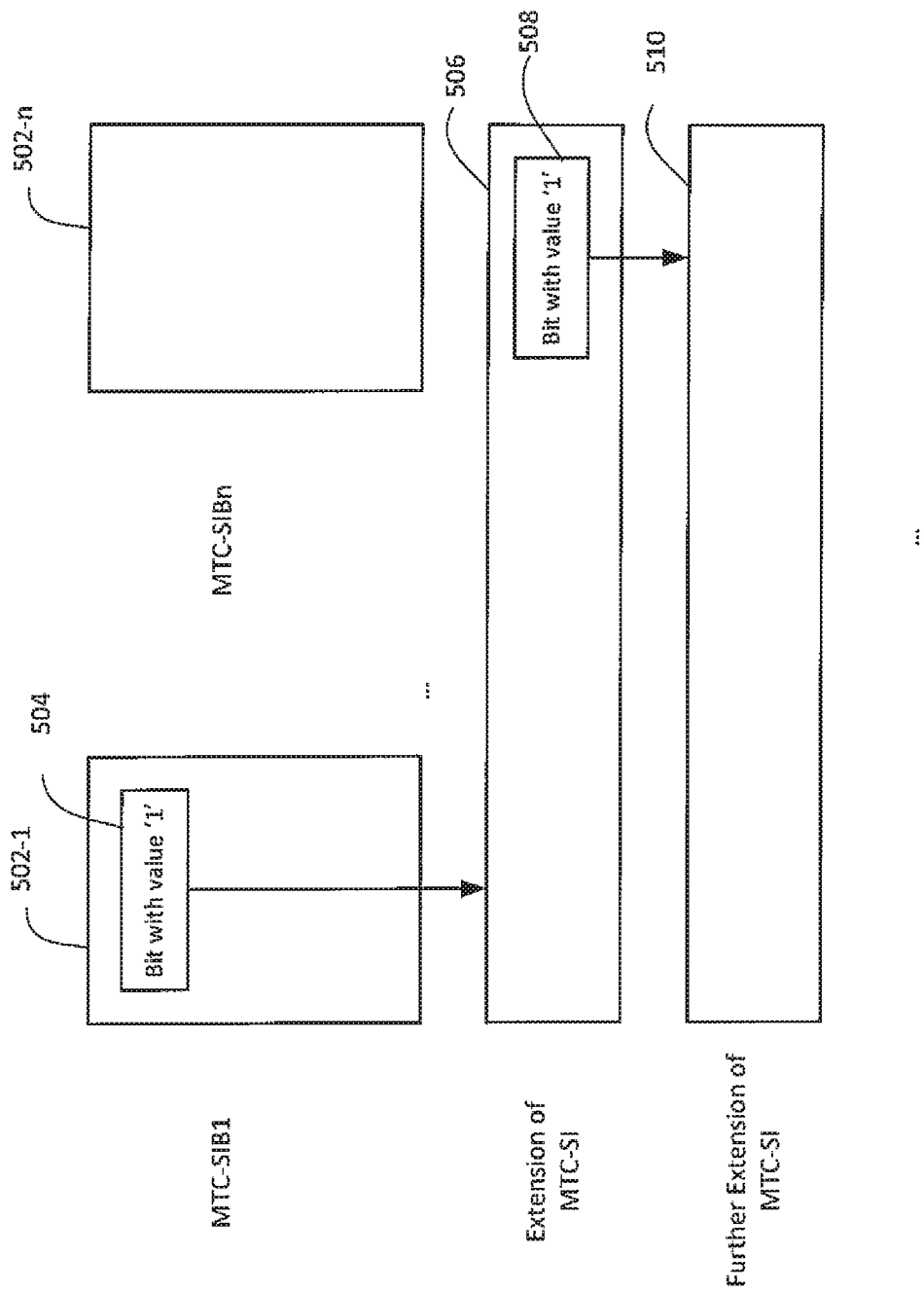
FIG. 7 illustrates an exemplary way in which an MTC specific common control signalling can be provided in the system shown in FIG. 1.

Alternatively, as illustrated in FIG. 7, any one of a plurality of MTC-SIBs 502 can include a bit 504 indicating the general availability of an extension 506 of system information for any of that plurality of MTC-SIBs 502. That is, any one of a plurality of MTC-SIBs 502 can include a bit 504 (or flag) having, for example, one of two values such as "1" or "0", respectively indicating whether or not an extension 506 of system information as a whole is or is not available. Furthermore, the extended system information 506 itself can include a bit 508 having, for example, one of two values such as "1" or "0", respectively indicating whether or not a further extension of the system information is generally available. For example, as shown in FIG. 5, the MTC-SIB 502-1 includes a bit 504 having a value of "1" to indicate that there is an extension 506 to the system information. The extension 506 itself includes a bit 508 having a value of "1" to indicate that there is a further extension 510 of the system information.

In practice, this example may be implemented for the Rel-13 version of the standards relating to MTC devices by setting the bit to "0" and allowing future releases to allow the bit to be set to "1" and define the contents of the extension part(s). For example, the extension part(s) could define: the message(s) for the extension information named as MTCSIB—extension (TBS) and their scheduling scheme, resource allocation (RA) (including time and spectrum position and repetition times), or transmission formats (MCS, RV, etc.).

Optionally, the corresponding scheduling information of the extension part can be indicated.

Example 3

Operation—Third Example

Figure 8:
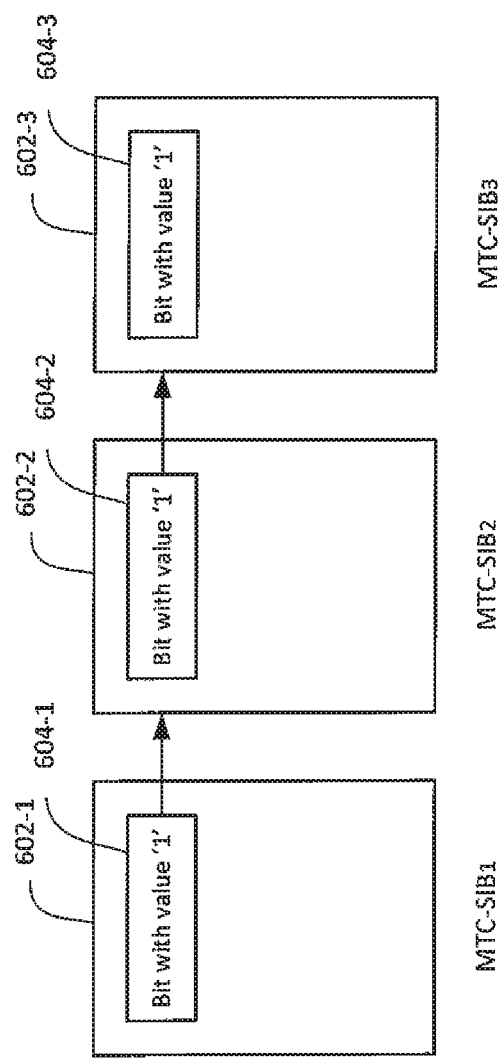
FIG. 8 illustrates an exemplary way in which an MTC specific common control signalling can be provided in the system shown in FIG. 1.
Figure 9:
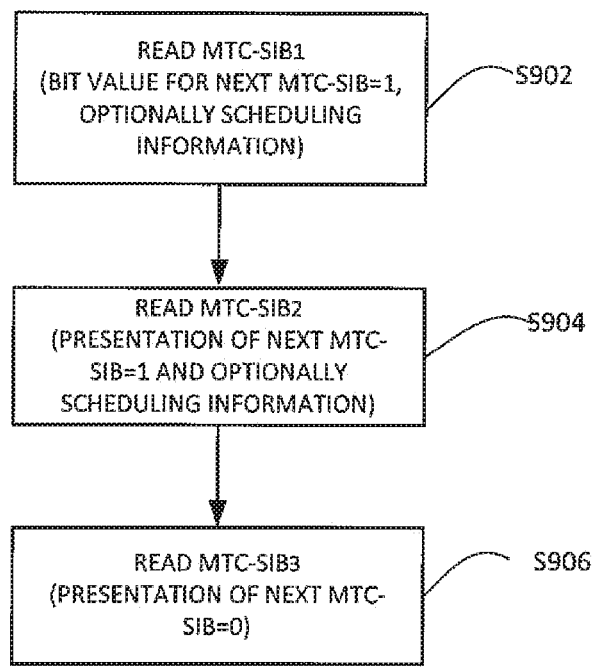
FIG. 9 illustrates an exemplary way in which an MTC specific common control signalling can be provided in the system shown in FIG. 1.

A third exemplary way in which an MTC common control transmission can be provided in the system shown in FIG. 1 is illustrated in FIGS. 8 and 9 in which bit(s) in one MTC-SIB can be used to indicate availability of a subsequent MTC-SIB.

As seen in FIG. 8, MTC-SIB$_n$ 602-n can include one or more bits to indicate the availability of MTC-SIB$_{n+1}$ 602-n+1. It will be appreciated that the MTC-SIBs may also, optionally, include the corresponding scheduling information for the next MTC-SIB.

Referring to FIG. 9 which illustrates how a UE 3 can read and interpret the MTC-SIBs, at step S902 the UE first reads MTC-SIB$_1$ 601-1, which uses the PBCH like way with fixed message size and scheduling scheme. After decoding MTC-SIB$_1$ 601-1, the UE 3 knows that there is another MTC-SIB 601-2, denoted as MTC-SIB$_2$. Thus, at step S904, the UE 3 reads MTC-SIB$_2$ 601-2 and, after decoding it, the UE 3 determines, from the presence of bit 604-2 with a value of "1" that there is yet another MTC-SIB, denoted as MTC-SIB$_3$ 601-3. Accordingly, at step S906, the UE 3 reads MTC-SIB$_3$ 601-3 to determine that there is no further MTC-SIB, i.e., the bit 604-3 has a value of "0".

The MTC-SIB$_n$ and its scheduled MTC-SIB$_{n+1}$ can be in the same release or in neighbour releases.

FIGS. 10a and 10b show how and where bit(s) can be added to indicate the extension of MTC-SIB or the subsequent MTC-SIB, in accordance with the second and third examples. For example, as shown in FIG. 10a, it is possible to include an IE in MTC-SIB message. Alternatively, as shown in FIG. 10b, it is possible to add the information at the end of the TB in the physical layer.

Example 4

Operation—Fourth Example

Figures 11A, 11B:
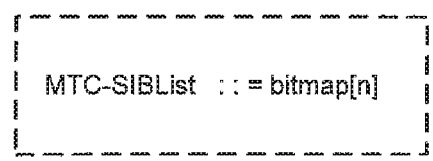
FIG. 11a illustrates an exemplary way in which an MTC specific common control signalling can be provided in the system shown in FIG. 1.
FIG. 11b illustrates an exemplary way in which an MTC specific common control signalling can be provided in the system shown in FIG. 1.

A fourth exemplary way in which an MTC common control transmission can be provided in the system shown in FIG. 1 is illustrated in FIG. 11a in which one MTC-SIB includes information indicating availability of all other MTC-SIBs and FIG. 11b in which scheduling information is also included for all other MTC-SIBs.

Specifically, FIGS. 11a and 11b provide two examples of how such information can be included in an MTC-SIB. As seen in FIG. 11a, the information identifying the presence or absence of other MTC-SIBs is provided as a bitmap. For example, the bitmap could comprise an N-bit (e.g. 20 bit) bitmap corresponding to N (e.g. 20) MTC-SIBs with the first bit ('b0') indicating the availability of MTC-SIB$_1$ the second bit ('b1') indicating the availability of MTC-SIB$_2$ etc. Alternatively, as shown in FIG. 11b the information can be provided as a list in which the first entry of the list indicates the availability of the MTC-SIB$_1$ and optionally, if it is available, what the corresponding scheduling information is, the second entry of the list indicates the availability of the MTC-SIB$_2$ and optionally, if it is available, what the corresponding scheduling information is.

As seen in FIG. 11b, the scheduling information for all later MTC-SIBs can be sent in a single advanced MTC-SIB, e.g. MTC-SIB$_1$ in other examples.

Modifications and Alternatives

Detailed exemplary embodiments have been described above. As those skilled in the art will appreciate, a number of modifications and alternatives can be made to the above exemplary embodiments whilst still benefiting from the inventions embodied therein.

It will be appreciated that the inclusion of bits indicating scheduling is entirely optional so that the message size can be kept to a minimum. If not included, scheduling can be predefined. The scheduling information can comprise one or more of: periodicity, offset, repeating times/window, resource allocation, and transmission format.

It will be appreciated that these examples described above are not mutually exclusive and any of the examples may be combined within the same system, either within a single cell and/or in neighbouring cells.

It will be appreciated that although the communication system is described in terms of the base station operating as a E-UTRAN base station (eNB), the same principles may be applied to base stations operating as macro or pico base stations, femto base stations, relay nodes providing elements of base station functionality, home base stations (HeNB), or other such communication nodes.

In the above exemplary embodiments, an LTE telecommunications system was described. As those skilled in the art will appreciate, the techniques described in the present application can be employed in other communications systems, including earlier 3GPP type systems. Other communications nodes or devices may include user devices such as, for example, personal digital assistants, laptop computers, web browsers, etc.

In the exemplary embodiments described above, the base station and the communication device each include transceiver circuitry. Typically, this circuitry will be formed by dedicated hardware circuits. However, in some exemplary embodiments, part of the transceiver circuitry may be implemented as software run by the corresponding controller.

In the above exemplary embodiments, a number of software modules were described. As those skilled in the art will appreciate, the software modules may be provided in compiled or un-compiled form and may be supplied to the base station or the user device as a signal over a computer network, or on a recording medium. Further, the functionality performed by part or all of this software may be performed using one or more dedicated hardware circuits.

In the above exemplary embodiments, machine-type communication devices and mobile telephones are described. However, it will be appreciated that mobile telephones (and similar user equipment) may also be configured to operate as machine-type communication devices. For example, the mobile telephone 3-1 may include (and/or provide the functionality of) the MTC module 45.

Examples of MTC Applications

It will be appreciated that each communication device may support one or more MTC applications. Some examples of MTC applications are listed in the following table (source: 3GPP TS 22.368, Annex B). This list is not exhaustive and is intended to be indicative of the scope of machine-type communication applications.

TABLE 1

| Service Area | MTC applications |
| --- | --- |
| Security | Surveillance systems |
| | Backup for landline |
| | Control of physical access (e.g. to buildings) |
| | Car/driver security |
| Tracking & Tracing | Fleet Management |
| | Order Management |
| | Pay as you drive |
| | Asset Tracking |
| | Navigation |
| | Traffic information |
| | Road tolling |
| | Road traffic optimisation/steering |
| Payment | Point of sales |
| | Vending machines |
| | Gaming machines |
| Health | Monitoring vital signs |
| | Supporting the aged or handicapped |
| | Web Access Telemedicine points |
| | Remote diagnostics |
| Remote Maintenance/Control | Sensors |
| | Lighting |
| | Pumps |
| | Valves |
| | Elevator control |
| | Vending machine control |
| | Vehicle diapostics |
| Metering | Power |
| | Gas |
| | Water |
| | Heating |
| | Grid control |
| | Industrial metering |
| Consumer Devices | Digital photo frame |
| | Digital camera |
| | eBook |

It will be appreciated that although the enhanced controlless common control transmission scheme is disclosed with specific reference to MTC devices where it is particularly advantageous it could also have benefits for any type of user equipment.

Various other modifications will be apparent to those skilled in the art and will not be described in further detail here.

This application is based upon and claims the benefit of priority from UK patent application No. 1501618.1, filed on Jan. 30, 2015, the disclosure of which is incorporated herein in its entirety by reference.

The invention claimed is:

1. A first communications apparatus which communicates with second communications apparatus, the first communications apparatus comprising:
   a transceiver configured to receive a Master Information Block (MIB), wherein a plurality of bits in the MIB are used to represent a value that maps to one of a plurality of Transport Block Sizes (TBSs) and to one of a plurality of numbers of repetitions; and
   at least one processor configured to determine, based on the value indicated by the plurality of bits, a TBS for System Information Block 1 (SIB1) and a number of repetitions of the SIB1,
   wherein the transceiver is further configured to receive the SIB1 based on the determined TBS and number of repetitions.

2. A first communications apparatus according to claim 1, wherein the SIB1 includes information indicating repetition times for a number of repetitions of other system information.

3. A first communications apparatus according to claim 2, wherein the other system information comprises system information for Machine Type Communications (MTC) apparatus.

4. A first communications apparatus according to claim 1, wherein the SIB1 is transmitted by a Physical Downlink Shared Channel (PDSCH).

5. A first communications apparatus according to claim 1, wherein the SIB1 indicates TBS information for other system information.

6. A first communications apparatus according to claim 1, wherein the SIB1 includes a periodicity and information for repetition of other system information.

7. A first communications apparatus according to claim 1, wherein the SIB1 includes information, of release 13 of 3rd Generation Partnership Project (3GPP) standard, for repetition of other system information.

8. A method performed by a first communications apparatus which communicates with second communications apparatus, the method comprising:
   receiving a Master Information Block (MIB), wherein a plurality of bits in the MIB are used to represent a value that maps to one of a plurality of Transport Block Sizes (TBSs) and to one of a plurality of numbers of repetitions;
   determining, based on the value indicated by the plurality of bits, a TBS for System Information Block 1 (SIB1) and a number of repetitions of the SIB1; and
   receiving the SIB1 based on the determined TBS and number of repetitions.

9. A method according to claim 8, wherein the SIB1 includes information indicating repetition times for a number of repetitions of other system information.

10. A method according to claim 9, wherein the other system information comprises system information for Machine Type Communications (MTC) apparatus.

11. A method according to claim 8, wherein the SIB1 is transmitted by a Physical Downlink Shared Channel (PDSCH).

12. A method according to claim 8, wherein the SIB1 indicates TBS information for other system information.

13. A method according to claim 8, wherein the SIB1 includes a periodicity and information for repetition of other system information.

14. A method according to claim 8, wherein the SIB1 includes information, of release 13 of 3rd Generation Partnership Project (3GPP) standard, for repetition of other system information.

15. A second communications apparatus which communicates with first communications apparatus, the second communications apparatus comprising:
   a transceiver configured to:
   transmit a Master Information Block (MIB), wherein a plurality of bits in the MIB are used to represent a value that maps to one of a plurality of Transport Block Sizes (TBSs) for System Information Block 1 (SIB1) and to one of a plurality of numbers of repetitions of the SIB1; and
   transmit the SIB1 based on the one of the plurality of TBSs and the one of the plurality of numbers of repetitions.

16. A second communications apparatus according to claim 15, wherein the SIB1 includes information indicating repetition times for a number of repetitions of other system information.

17. A second communications apparatus according to claim 16, wherein the other system information comprises system information for Machine Type Communications (MTC) apparatus.

18. A second communications apparatus according to claim 15, wherein the SIB1 is transmitted by a Physical Downlink Shared Channel (PDSCH).

19. A second communications apparatus according to claim 15, wherein the SIB1 indicates TBS information for other system information.

20. A second communications apparatus according to claim 15, wherein the SIB1 includes a periodicity and information for repetition of other system information.

21. A second communications apparatus according to claim 15, wherein the SIB1 includes information, of release 13 of 3rd Generation Partnership Project (3GPP) standard, for repetition of other system information.

22. A method performed by a second communications apparatus which communicates with first communications apparatus, the method comprising:
   transmitting a Master Information Block (MIB), wherein a plurality of bits in the MIB are used to represent a value that maps to one of a plurality of Transport Block Sizes (TBSs) for System Information Block 1 (SIB1) and to one of a plurality of numbers of repetitions of the SIB1; and
   transmitting the SIB1 based on the one of the plurality of TBSs and the one of the plurality of number of repetitions.

23. A method according to claim 22, wherein the SIB1 includes information indicating repetition times for a number of repetitions of other system information.

24. A method according to claim 23, wherein the other system information comprises system information for Machine Type Communications (MTC) apparatus.

25. A method according to claim 22, wherein the SIB1 is transmitted by a Physical Downlink Shared Channel (PDSCH).

26. A method according to claim 22, wherein the SIB1 indicates TBS information for other system information.

27. A method according to claim 22, wherein the SIB1 includes a periodicity and information for repetition of other system information.

28. A method according to claim 22, wherein the SIB1 includes information, of release 13 of 3rd Generation Partnership Project (3GPP) standard, for repetition of other system information.

* * * * *

UNITED STATES PATENT AND TRADEMARK OFFICE
CERTIFICATE OF CORRECTION

PATENT NO. : 10,862,619 B2
APPLICATION NO. : 15/546163
DATED : December 8, 2020
INVENTOR(S) : Yuhua Chen et al.

Page 1 of 1

It is certified that error appears in the above-identified patent and that said Letters Patent is hereby corrected as shown below:

In the Claims

At Column 18, Claim number 22, Line number 36 should read:
TBSs and the one of the plurality of numbers of repeti- Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*